(12) United States Patent
Wang

(10) Patent No.: US 10,750,003 B2
(45) Date of Patent: *Aug. 18, 2020

(54) METHOD, SYSTEM, AND DEVICE FOR PROCESS TRIGGERING

(71) Applicant: Alibaba Group Holding Limited, Grand Cayman (KY)

(72) Inventor: Dafeng Wang, Hangzhou (CN)

(73) Assignee: Alibaba Group Holding Limited, Grand Cayman (KY)

( * ) Notice: Subject to any disclaimer, the term of this patent is extended or adjusted under 35 U.S.C. 154(b) by 0 days.

This patent is subject to a terminal disclaimer.

(21) Appl. No.: 16/563,073

(22) Filed: Sep. 6, 2019

(65) Prior Publication Data

US 2019/0394321 A1 Dec. 26, 2019

Related U.S. Application Data

(63) Continuation of application No. 15/332,663, filed on Oct. 24, 2016, now Pat. No. 10,455,069.

(30) Foreign Application Priority Data

Oct. 29, 2015 (CN) .......................... 2015 1 0726028

(51) Int. Cl.
*H04W 88/02* (2009.01)
*H04M 1/673* (2006.01)
(Continued)

(52) U.S. Cl.
CPC ........ *H04M 1/673* (2013.01); *G06F 3/04883* (2013.01); *G06K 7/1417* (2013.01);
(Continued)

(58) Field of Classification Search
CPC ..... H04W 12/02; H04W 12/06; H04W 4/001; H04W 88/02; H04W 12/08; H04W 12/00508; H04W 48/02; H04W 52/0277
(Continued)

(56) References Cited

U.S. PATENT DOCUMENTS 8,136,053 B1 3/2012 Miller et al.
8,402,533 B2 3/2013 LeBeau et al.
(Continued)

FOREIGN PATENT DOCUMENTS

CN 101916166 A 12/2010
JP 2007122457 A 5/2007
(Continued)

OTHER PUBLICATIONS

First Office Action and First Search for Chinese Application No. 201510726028.8 dated Jul. 1, 2019, 6 pages.
(Continued)

*Primary Examiner* — Jean A Gelin
(74) *Attorney, Agent, or Firm* — Sheppard Mullin Richter & Hampton LLP

(57) ABSTRACT

A process triggering method is disclosed. The method may be implemented by a processor. The method may comprise receiving an input operation on an unlock interface of a terminal device, determining input operation information corresponding to the input operation, determining triggering operation information matching with the determined input operation information, determining a process corresponding to the input operation according to a predetermined corresponding relationship between the triggering operation information and the process, and triggering the process.

20 Claims, 5 Drawing Sheets

(51) Int. Cl.
| | |
|---|---|
| *G06F 3/0488* | (2013.01) |
| *G06Q 20/32* | (2012.01) |
| *G06K 7/14* | (2006.01) |
| *H04M 1/725* | (2006.01) |
| *H04W 52/02* | (2009.01) |

(52) U.S. Cl.
CPC ......... *G06Q 20/32* (2013.01); *G06Q 20/3274* (2013.01); *H04M 1/72522* (2013.01); *H04M 2250/66* (2013.01); *H04W 52/0277* (2013.01); *H04W 88/02* (2013.01)

(58) Field of Classification Search
USPC ........ 455/410, 411, 420, 457, 459, 466, 566
See application file for complete search history.

(56) References Cited

U.S. PATENT DOCUMENTS

| | | | |
|---|---|---|---|
| 8,434,153 | B2 | 4/2013 | Sundaramurthy et al. |
| 8,660,531 | B2 | 2/2014 | Hymel |
| 8,839,413 | B2 | 9/2014 | LeBeau et al. |
| 8,850,560 | B2 | 9/2014 | Kim et al. |
| 8,854,318 | B2 | 10/2014 | Borovsky et al. |
| 8,973,104 | B2 | 3/2015 | Rokusek et al. |
| 9,027,117 | B2 | 5/2015 | Wilairat |
| 9,134,897 | B2 | 9/2015 | Hsieh |
| 9,536,064 | B2 | 1/2017 | Chang et al. |
| 2004/0085351 | A1 | 5/2004 | Tokkonen |
| 2009/0289916 | A1 | 11/2009 | Dai |
| 2010/0159995 | A1 | 6/2010 | Stallings et al. |
| 2011/0283241 | A1 | 11/2011 | Miller et al. |
| 2012/0036556 | A1 | 2/2012 | LeBeau et al. |
| 2012/0133484 | A1 | 5/2012 | Griffin |
| 2012/0284297 | A1 | 11/2012 | Aguera-Arcas et al. |
| 2013/0135226 | A1 | 5/2013 | Ho |
| 2013/0191910 | A1 | 7/2013 | Dellinger et al. |
| 2013/0249843 | A1 | 9/2013 | Yano |
| 2013/0283199 | A1 | 10/2013 | Selig et al. |
| 2014/0057610 | A1 | 2/2014 | Olincy et al. |
| 2014/0109024 | A1 | 4/2014 | Miyazaki |
| 2014/0109217 | A1 | 4/2014 | Park |
| 2014/0335826 | A1 | 11/2014 | Yu et al. |
| 2014/0365904 | A1 | 12/2014 | Kim et al. |
| 2014/0372896 | A1 | 12/2014 | Raman |
| 2015/0031333 | A1 | 1/2015 | Lee |
| 2015/0128060 | A1 | 5/2015 | Xu et al. |
| 2015/0135108 | A1 | 5/2015 | Pope et al. |
| 2015/0161589 | A1 | 6/2015 | Snider |
| 2015/0178721 | A1 | 6/2015 | Pandiarajan et al. |
| 2015/0213801 | A1 | 7/2015 | Wang et al. |
| 2015/0374163 | A1 | 12/2015 | Spano et al. |
| 2016/0065713 | A1 | 3/2016 | Yang et al. |
| 2016/0205554 | A1 | 7/2016 | Cagle |
| 2016/0226865 | A1 | 8/2016 | Chen et al. |
| 2016/0357384 | A1 | 12/2016 | Khalid et al. |
| 2017/0126875 | A1 | 5/2017 | Wang |
| 2018/0032997 | A1* | 2/2018 | Gordon .............. G06Q 20/3224 |

FOREIGN PATENT DOCUMENTS

| | | |
|---|---|---|
| JP | 2013-025357 A | 2/2013 |
| JP | 2013-065289 A | 4/2013 |
| JP | 2013-200828 A | 10/2013 |
| JP | 2013228953 A2 | 11/2013 |
| TW | 201504919 A | 2/2015 |

OTHER PUBLICATIONS

Decision to Reject for Taiwanese Application No. 105118394 dated Apr. 30, 2019, 3 pages.
Office Action for Japanese Application No. 2018-522048 dated Jul. 4, 2019, 5 pages.
Extended European Search Report for European Application No. 168605665 dated May 7, 2019, 8 pages.
Office Action for Taiwanese Application No. 105118394 dated Dec. 25, 2018, 8 pages.
International Preliminary Report on Patentability for Application No. PCT/US2016/058451, dated May 1, 2018, 5 pages.
International Search Report and Written Opinion for Application No. PCT/US2016/058451, dated Jan. 3, 2017.
Lu et al. Gesture On: Enabling Always-On Touch Gestures for Fast Mobile Access from the Device Standby Mode. Proceedings of the 33rd ACM Conference on Human Factors in Computing Systems; 3355-3364, Apr. 18, 2015. [retrieved on Mar. 14, 2017]. Retrieved from the Internet. <URL: http://dl.acm.org/results.cfm?within=owners.owner%3DHOSTED&srt=_score&query=always-on+touch+gestures&Go.x=0&Go.y=0>.
Office Action for Korean Application No. 10-2018-7015014 dated Jul. 15, 2019, 12 pages.
1st Examination Report for Australian Application No. 2019253827 dated Jan. 13, 2020 (3 pages).
Office Action for Korean Application No. 10-2018-7015014 dated Jan. 8, 2020 (9 pages).
Notice of Allowance for Japanese Application No. 2018-522048 dated Mar. 3, 2020.
Office Action for Korean Application No. 10-2018-7015014 dated Feb. 24, 2020.
Supplementary Search Report for Chinese Application No. 201510726028.8 dated Mar. 6, 2020.
Second Office Action for Chinese Application No. 201510726028.8 dated Mar. 13, 2020.
Third Office Action for Chinese Application No. 201510726028.8 dated May 7, 2020.

* cited by examiner

METHOD, SYSTEM, AND DEVICE FOR PROCESS TRIGGERING

CROSS REFERENCE TO RELATED APPLICATION

The present application is a continuation application of U.S. patent application Ser. No. 15/332,663, filed on Oct. 24, 2016, which claims the benefit of priority to Chinese Application No. 201510726028.8, filed Oct. 29, 2015, and entitled "METHOD, SYSTEM, AND DEVICE FOR PROCESS TRIGGERING." The contents of all of the above applications are incorporated herein by reference in their entirety.

Technical Field

The present disclosure relates generally to computer technologies, and more particularly, to methods, systems, and devices for process triggering.

BACKGROUND

With developments in mobile technologies, mobile phones have become an indispensable part of people's daily life, for offering various functionalities and providing convenient accesses to information. In existing technologies, each personal mobile terminal generally corresponds to a user or owner, and comes with a lock screen mechanism to protect personal data stored in the mobile terminal. In a lock-screen state, a user may only be able to access basic information, such as date, time, and power, instead of full services offered by the mobile terminal, including certain built-in functions and applications. A screen-locked mobile terminal may not be used normally until someone who set up the lock screen password unlocks the mobile terminal. That is, if at this time someone wants to access more than the basic information from the mobile terminal, such as using an application, the user have to go through procedures including phone unlocking and application searching before starting the application. In addition, some applications in the mobile terminal may only be located after pressing through multiple interfaces. Therefore, such procedures can be complicated and inconvenient to consumers, especially those who use mobile phones frequently.

SUMMARY

One aspect of the present disclosure is directed to a process triggering method. The method may be implemented by a processor of a terminal device. The method may comprise receiving an input operation on an unlock interface of the terminal device, determining input operation information corresponding to the input operation, determining triggering operation information matching with the determined input operation information, determining a process corresponding to the input operation according to a predetermined corresponding relationship between the triggering operation information and the process, and triggering the process. In some embodiments, the process is different from an unlock process, and the input operation is different from an operation that merely unlock the terminal device.

Another aspect of the present disclosure is directed to a process triggering apparatus. The apparatus may comprising a monitoring module configured to receive an input operation on an unlock interface of the apparatus, an operation information module configured to determine input operation information corresponding to the input operation, a process matching module configured to determine triggering operation information matching with the determined input operation information, and determine a process corresponding to the input operation according to a predetermined corresponding relationship between the triggering operation information and the process, and a triggering module configured to trigger the process. In some embodiments, the process is different from an unlock process, and the input operation is different from an operation that merely unlock the terminal device.

A further aspect of the present disclosure is directed to a process triggering method. The method may be implemented by a processor of a terminal device. The method may comprise receiving an input operation on an unlock interface of the terminal device, determining a process installed on the terminal device and corresponding to the input operation according to a corresponding relationship between the input operation and the process, and triggering the process. In some embodiments, the process is different from an unlock process, and the input operation is different from an operation that merely unlock the terminal device.

It is to be understood that the foregoing general description and the following detailed description are exemplary and explanatory only, and are not restrictive of the invention, as claimed.

BRIEF DESCRIPTION OF THE DRAWINGS

The accompanying drawings, which constitute a part of this disclosure, illustrate several embodiments and, together with the description, serve to explain the disclosed principles.

DETAILED DESCRIPTION

Reference will now be made in detail to exemplary embodiments, examples of which are illustrated in the accompanying drawings. The following description refers to the accompanying drawings in which the same numbers in different drawings represent the same or similar elements unless otherwise represented. The implementations set forth in the following description of exemplary embodiments consistent with the present invention do not represent all implementations consistent with the invention. Instead, they are merely examples of systems and methods consistent with aspects related to the invention.

Current process triggering technologies are inconvenient to users, for example, when users try to start an application in a screen-locked state. A process can be a service, a program, or an application on a computer system, such as a mobile device, a tablet device, or other computing devices. The disclosed systems and methods may mitigate or overcome one or more of the problems set forth above and/or other problems in the prior art.

Figure 1:
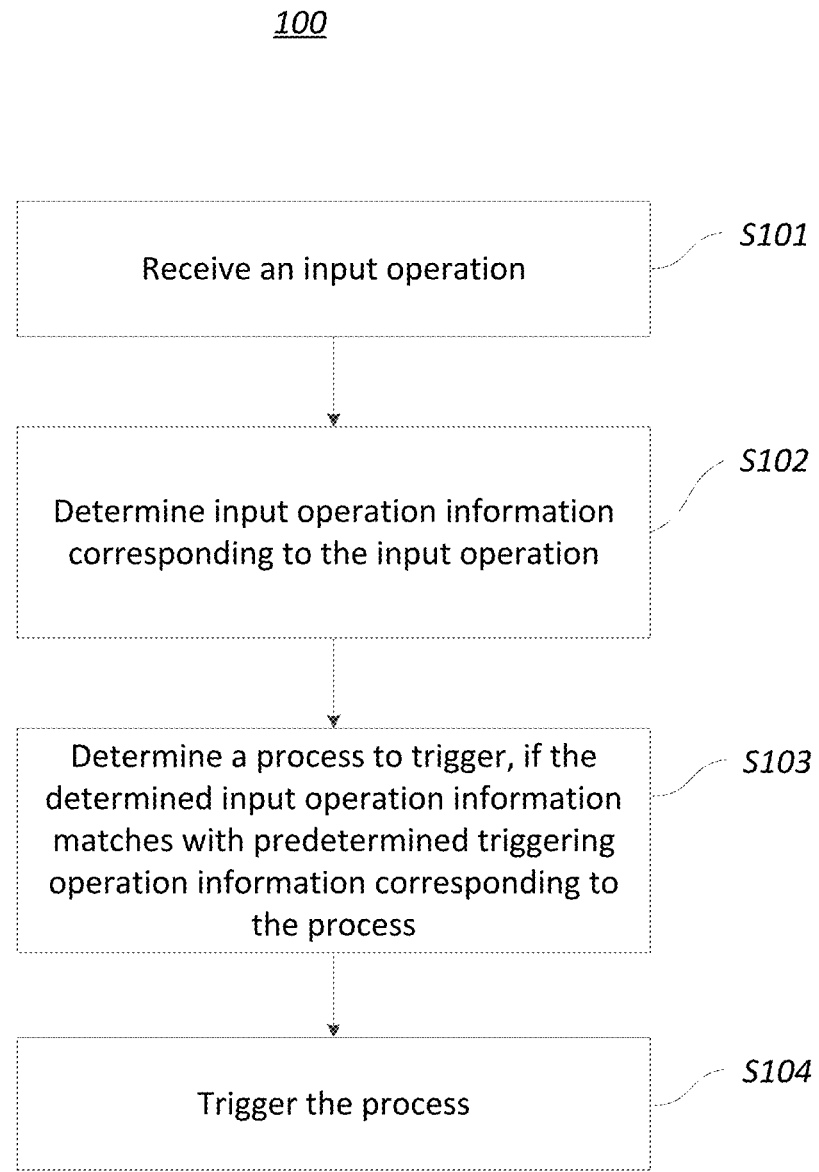
FIG. 1 is a flow diagram illustrating a method for process triggering, consistent with exemplary embodiments of the present disclosure.

FIG. 1 is a flow diagram illustrating a method 100 for process triggering, consistent with exemplary embodiments of the present disclosure. Method 100 may include the following steps, some of which may be optional. Method 100 may be performed by one or more components of system 300 described below with reference to FIG. 3.

At step S101, one or more components of system 300 may receive an input operation on an unlock interface (e.g., an interface for receiving an user's input to unlock the system when the system is in a locked state). For example, an unlock interface such as a touch screen may receive an input operation and transmit the input operation to a processor, and the processor may receive the input operation.

In some embodiments, a user interface of a terminal device, e.g., a screen of a mobile terminal, may receive the input operation from a user. The user interface may be in a locked state. The user interface or the mobile terminal may be locked or unlocked by various types of lock or unlock controls. The unlock controls may include a trajectory unlock control, a password unlock control, an account unlock control, a biological information unlock control (e.g., a fingerprint input control, a face scan control), and etc. Correspondingly, the input operation may include, but is not limited to, a sliding trajectory input operation, a text input operation, a biological information input operation, and etc. The mobile terminal in the present application may include, but is not limited to, a mobile phone, a tablet computer, a mobile multimedia playback device, a smart watch, and etc. The mobile terminal may have a normal unlock operation that, if performed on the user interface, can unlock the terminal device. The input operation may be different from the unlock operation. For example, an unlock operation may include typing code 123456 that will merely unlock the terminal device. The input operation may be typing code 3210, which is different from the unlock operation. As described below, the terminal device may react with the input operation of typing code 3210.

At step S102, one or more components of system 300, e.g., the processor, may determine input operation information corresponding to the input operation.

In some embodiments, the input operation inputted by the user may correspond to input operation information. For example, if a user performs an input operation by touching a screen with a finger and sliding the finger, the sliding trajectory may be determined as the corresponding input operation information. For another example, if a user performs a text input operation, text information inputted by the user (e.g., a password) may be determined as the corresponding input operation information. In some embodiments, the input operation information may include an input sliding trajectory, text information, biological characteristic information, and/or other input operation information.

In some embodiments, in order to respond to an input operation by a user and perform corresponding processes, a mobile terminal may need to obtain input operation information corresponding to the input operation. Therefore, in this step, the mobile terminal may determine the input operation information corresponding to the input operation by the user.

At step S103, one or more components of system 300, e.g., the processor, may determine a process to trigger (e.g., a process corresponding to the input operation), if the determined input operation information matches with predetermined triggering operation information corresponding to the process. The process may be different from a normal unlock process. For example, if the unlock password is 123456 and if a user types 3210, the terminal device will not perform an unlock process, but may react with the code 3210 to trigger another process, as described in detail below.

In some embodiments, one or more components of system 300, e.g., the processor, may first determine if the input operation information matches with any piece of predetermined triggering operation information of a set of predetermined triggering operation information, and each piece of the predetermined triggering operation information in the set may correspond to one or more processes. If the input operation information is determined to match with a certain piece predetermined triggering operation information, the input operation information can be determined to trigger one or more processes corresponding to the piece of predetermined triggering operation information. That is, if the determined input operation information matches with at least one piece among the set of predetermined triggering operation information, a process corresponding to the input operation can be determined according to a predetermined corresponding relationship between the piece of predetermined triggering operation information and one or more corresponding processes. Each piece of predetermined triggering operation information among the set may have a corresponding relationship with one or more processes. If the input operation information is determined to not match with any predetermined triggering operation information among the set, the method may end.

The triggering operation information may be a special input operation information, for invoking one or more processes, such as a specific process in the mobile terminal. In one example, the input operation by the user may be an operation to unlock the operation system of the mobile terminal, or a triggering operation for a specific process on the mobile terminal. Thus, the mobile terminal may recognize the input operation information corresponding to the input operation by the user, in order to determine whether the input operation information matches with any triggering operation information.

After the input operation information by the user is determined to be the piece of triggering operation information, the mobile terminal may determine a process, e.g., a service, corresponding to the triggering operation information according to a preset corresponding relationship between triggering operation information and one or more processes.

In some embodiments, the triggering operation information may cause the mobile terminal to be unlocked at the system level and may trigger a specific process. For example, when the input operation information is determined to match the triggering operation information, in addition to trigger the process, the mobile terminal may be unlocked at the system level. In some embodiments, the triggering operation information may just trigger the process, while the system of the mobile terminal remains in a locked state.

At step S104, one or more components of system 300, e.g., the processor, may trigger the process. The triggered process may correspond to the input operation information. The processor may control the interface to display the triggered process or an image associated with the triggered process.

As described above, the input operation by the user may be a triggering operation to start a certain process (e.g., a service, a program, or an application) in the mobile terminal. After the mobile terminal determines a process corresponding to the triggering operation information, the process can be triggered.

By the above steps, a mobile terminal can monitor a user's input operation at an interface, and when the mobile terminal determines that input operation information corresponding to the input operation matches with triggering operation information, the mobile terminal can trigger a process corresponding to the triggering operation information according to a preset corresponding relationship between various triggering operation information and processes. Such method can enable the user to configure triggering operation information to directly trigger a desired process by a user input. Thus, the user can save the trouble of performing a system-level input operation on the mobile terminal and searching for the desired process, while preserving the security protection. Therefore, the method described above can effectively simplify the process of process triggering, especially for locked terminal devices, and increase the efficiency of performing tasks with such mobile terminals.

In some embodiments, the triggering operation information may include default triggering operation information and/or custom triggering operation information.

With respect to the triggering operation information including the default triggering operation information, the default triggering operation information may be pre-determined by a system service provider of the mobile terminal. That is, the system service provider may determine triggering instructions (the triggering instructions herein may refer to the default triggering operation information) of different processes in the system of the mobile terminal. For example, if the system service provider pre-determines that a triggering instruction (default triggering operation information) of a video playback service is 1234, when the mobile terminal is in a screen-locked state, a user can trigger the video playback process by inputting the triggering instruction "1234".

In some embodiments, an application installed onto the mobile terminal may pre-define the default triggering operation information. However, in some embodiments, an application in an Android system or an iOS system may not have the permission to invoke other applications. Therefore, when the application installed onto the mobile terminal pre-defines the default triggering operation information, processes triggered by the application may often be various functional processes associated with the application.

In some embodiments, the triggering operation information may include the custom triggering operation information. That is, a user can customize and configure triggering operation information corresponding to various processes in the system of the mobile terminal. It is also feasible to input the custom triggering operation information through an application installed in the mobile terminal.

Two types of triggering operation information are described above. With the default triggering operation information, a user can trigger the corresponding process by just inputting the pre-determined default triggering operation information at an interface. With the custom triggering operation information, the user can configure triggering operation information corresponding to various processes in the mobile terminal (or in a designated application) in advance.

In some embodiments, when the triggering operation information includes the custom triggering operation information, the corresponding relationship between the triggering operation information and the process may be predetermined. A method for configuring the triggering operation information may include receiving custom triggering operation information configured by a user, receiving a selection instruction inputted by the user, determining a process corresponding to the selection instruction, and establishing a corresponding relationship between the custom triggering operation information and the determined process.

The custom triggering operation information configured by the user may be determined from a custom triggering operation inputted by the user. In some embodiments, the custom triggering operation inputted by the user may include, but is not limited to, inputting a sliding trajectory, inputting text information, inputting biological information, and etc.

In some embodiments, the system of the mobile terminal may provide the function of configuring custom triggering operation information by the user. In this way, the user may input the custom triggering operation information in the system of the mobile terminal, and the system of the mobile terminal may establish a corresponding relationship between the custom triggering operation information inputted by the user and a process selected by the user.

In some embodiments, a third-party application may provide the function of configuring custom triggering operation information by the user. In this way, the user may input the custom triggering operation information in the third-party application, and the third-party application may establish a corresponding relationship between the custom triggering operation information inputted by the user and a process selected by the user.

Whether the system of the mobile terminal or the third-party application provides the above functions, an actual operation process of establishing a corresponding relationship between the custom triggering operation information and the process selected by the user may be performed as the following. When the user wants to set corresponding custom triggering operation information for some processes on the mobile phone, the user can enter a corresponding process list interface (provided by a mobile phone system or by a third-party application) and select (e.g., by clicking) a process in the process list. Then, a display window of the mobile phone may pop up an input interface. On the input interface, one or more control options can be provided, such as a sliding trajectory input control, a text information input control, a biological characteristic information input control, and etc. The user can input the custom triggering operation information in the input interface by selecting one of the control options and entering control information, e.g., a password. After the user completes the input, a corresponding relationship between the custom triggering operation information and the process selected by the user can be established.

The above example of establishing a corresponding relationship between the custom triggering operation information and the process selected by the user does not constitute a limitation to the present application.

In applications, various processes can be rapidly queried and used in the mobile terminal in a form of a process list recording process identification information (e.g., process ID, name, operation states, permissions, and etc.) of various processes. Establishing the corresponding relationship between the custom triggering operation information inputted by the user and the process corresponding to the selection instruction may also establish a corresponding relationship between the custom triggering operation information and the process identification information corresponding to the process.

Correspondingly, triggering the process corresponding to the input operation information may include: acquiring process identification information corresponding to the input operation information, searching for a process matching the process identification information from a process list according to the process identification information, and triggering a process matching the process identification information.

In some embodiments, the above-described input operation information can trigger the corresponding process, and may also have an unlock function. That is, after the mobile terminal receives the input operation information, the mobile terminal system can be unlocked; and at the same time, the corresponding process can be triggered. Such process does not require too many permissions, and is easy to implement in real applications. In some embodiments, for security reasons, the input operation information may not have a function of unlocking the mobile terminal system, and may only trigger the corresponding process. That is, after the corresponding process is triggered, the mobile terminal may still be in a locked state.

Corresponding to the above embodiments, the process triggering may be performed by a mobile terminal system, and may also be performed by a third-party application. With respect to the third-party application providing the process triggering function, the third-party application may be required to obtain a permission from the mobile terminal system. Due to the closed characteristic of the iOS system, it may be difficult to obtain the permission in an actual application, and thus, the following description may be based on an Android system.

One method to overcome the permission problem may include blocking the lock screen function of the mobile terminal system, and using a lock screen function of the third-party application. In this method, it may be needed to acquire a permission from the mobile terminal. For example, "android.permission_DISABLE_KEYGUARD" permission in the mobile terminal can be invoked to block the lock screen function built in the mobile terminal system. Afterwards, a lock screen function of the third-party application can be used to lock the screen of the mobile terminal. By this method, in a subsequent process of triggering a process, the third-party application can trigger the corresponding process according to the established corresponding relationship.

The above-described process triggering method is explained in more details below with reference to an application example.

A user plans to use a mobile phone to perform a code scanning payment operation (e.g., making a payment by scanning a payment Quick Response (QR) code stored in a payment application in a cellphone), and at this point, the user's mobile phone is in a locked or screen-locked state. With existing technologies, the user may need to unlock the mobile phone, select to start an payment application, and find a payment QR code from the payment application to use.

Figure 2A:
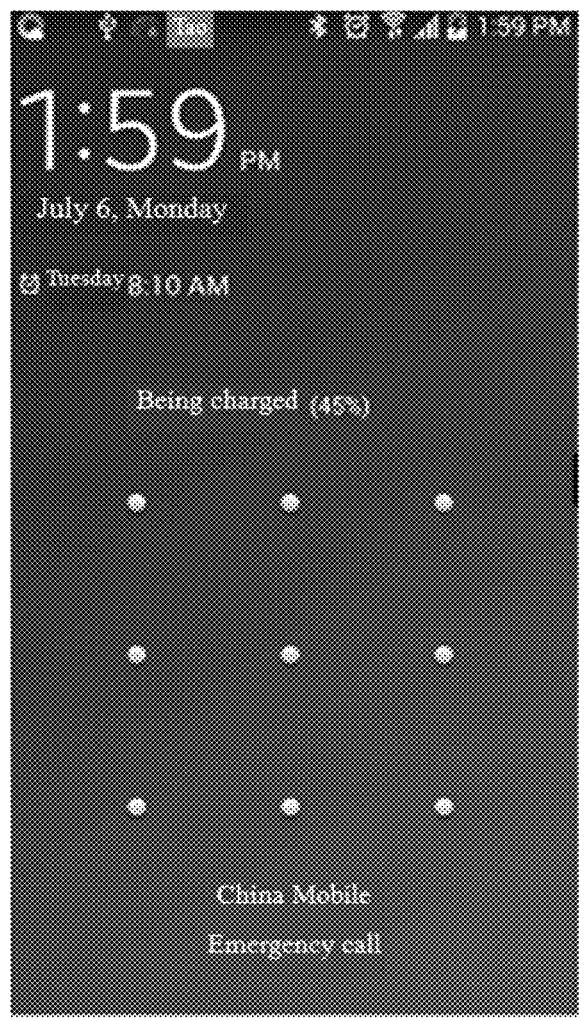
FIGS. 2A-2C are graphical representations illustrating a method for process triggering, consistent with exemplary embodiments of the present disclosure.

In some embodiments, the user can set a sliding trajectory, as described above with reference to the custom triggering operation information, in advance for the payment QR code in the payment application, to directly trigger the payment QR code when the mobile phone is in a locked state. Triggering the payment QR code may include the following steps:

At step 1, the user may press a power button or a home button of the mobile phone to enter an unlock interface, e.g., an interface in a locked state as shown in FIG. 2A.

Figure 2B:
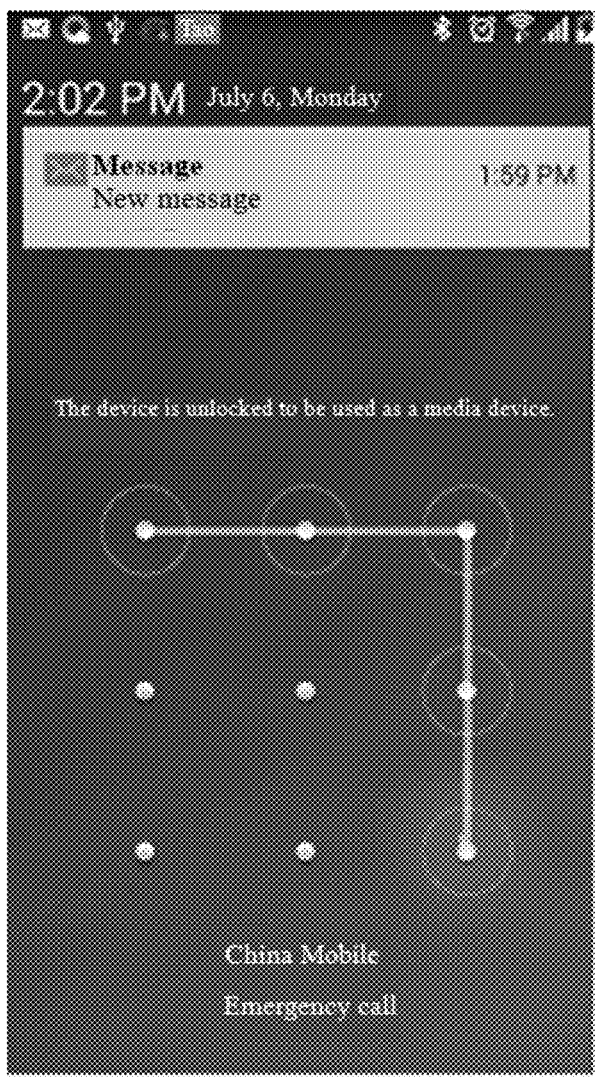

At step 2, the user may input a sliding trajectory in the interface, as shown in FIG. 2B. At this step, after receiving the input of the user, the mobile phone may determine whether the input sliding trajectory matches with a pre-determined sliding trajectory. If the mobile phone determines that the input sliding trajectory matches with the pre-determined sliding trajectory, it may trigger and/or invoke the payment QR code in the payment application.

Figure 2C:

At step 3, the mobile phone may display the payment QR code in a current interface, as shown in FIG. 2C.

As described above, triggering the process corresponding to the input operation information may include triggering the payment QR code in the payment application corresponding to the input operation information, and displaying the payment QR code on the interface.

In the present application, the user can still perform a regular unlock operation on the mobile terminal. That is, method 100 may further include, when the determined input operation information matches the predetermined unlock operation information, performing an unlock operation on the mobile terminal (e.g., unlocking the mobile phone operation system) according to the unlock operation information.

Figure 3:
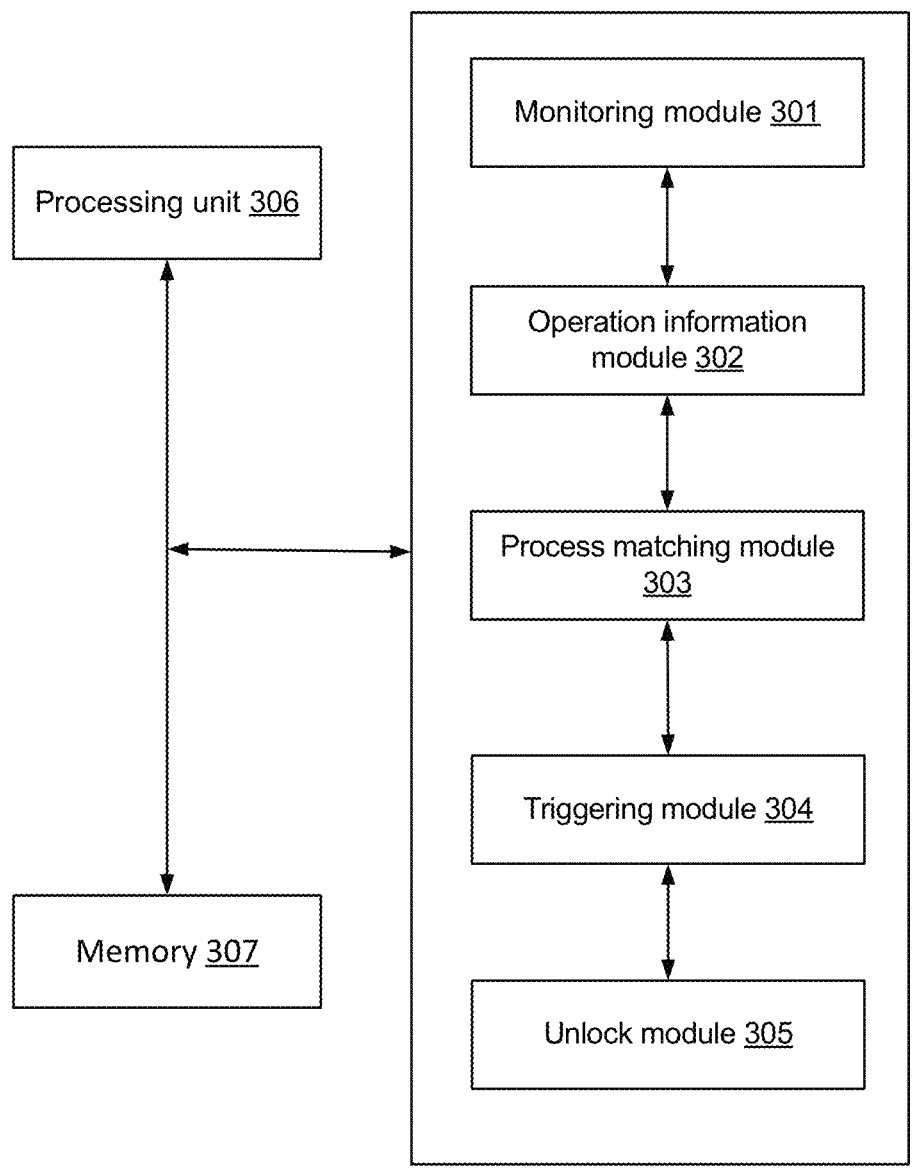
FIG. 3 is a block diagram illustrating a system for process triggering, consistent with exemplary embodiments of the present disclosure.

FIG. 3 is a block diagram illustrating a system 300 for process triggering, consistent with exemplary embodiments of the present disclosure. System 300 may be a device for process triggering, such as a mobile phone, a computing device, a tablet computer, a mobile multimedia playback device, a smart watch, and etc. System 300 may include a number of components, some of which may be optional. For example, system 300 may include one or more central processing units (CPUs) 306 and a memory 307. Memory 307 may be a non-transitory computer-readable storage medium storing instructions that, when executed by processing unit 306, cause one or more components of system 300 to perform the steps and methods described in this disclosure. System 300 may include functional modules implemented by the processing unit 306 and memory 307, including, e.g., a monitoring module 301, an operation information module 302, a process matching module 303, a triggering module 304, and an unlock module 305. Monitoring module 301, operation information module 302, process matching module 303, triggering module 304, and/or unlock module 305 refer to or correspond to blocks of software code stored on memory 307. The processing unit 306 can execute the blocks of software code and perform the functions corresponding to the functional modules. The steps below are related to corresponding methods described above, and some details are not repeated.

Monitoring module 301 may be configured to monitor an input operation at an interface. An example of monitoring module may be a screen or a screen interface configured to receive an input operation from a user.

Operation information module 302 may be configured to, after the input operation is received, determine input operation information corresponding to the input operation.

Process matching module 303 may be configured to, if the determined input operation information matches with pre-determined triggering operation information, determine a process corresponding to the input operation information according to a predetermined corresponding relationship between the predetermined triggering operation information and the process.

Triggering module 304 may be configured to trigger the process corresponding to the input operation information.

In some embodiments, the triggering operation information may include default triggering operation information and/or custom triggering operation information described above.

With respect to the triggering operation information including the custom triggering operation information, process matching module 303 may be configured to receive custom triggering operation information configured by a user, receive a selection instruction inputted by the user, determine process identification information corresponding to the selection instruction, and establish a corresponding relationship between the custom triggering operation information configured by the user and the process identification information corresponding to the selection instruction.

Triggering module 304 may be configured to acquire process identification information corresponding to the input operation information, search for a process matching with the process identification information in a process list according to the process identification information, and trigger the process matching with the process identification information.

In one embodiment, the process may be a payment QR code in a payment application, and the triggering module 304 may be configured to trigger the payment QR code in the payment application corresponding to the input operation information, and display the payment QR code.

In some embodiments, system 300 may further include an unlock module 305 configured to, when the determined input operation information matches with the predetermined unlock operation information, perform an unlock operation on the mobile terminal according to the unlock operation information.

In some embodiments, the input operation information may include at least one of an input sliding trajectory (e.g., a swipe password), text information (e.g., a text password), or biological characteristic information (e.g., a finger print).

Another aspect of the disclosure is directed to a non-transitory computer-readable storage medium storing instructions which, when executed, cause one or more processors to perform the methods, as discussed above. The computer-readable storage medium may include volatile or non-volatile, magnetic, semiconductor, tape, optical, removable, non-removable, or other types of computer-readable storage medium or computer-readable storage devices. For example, the computer-readable storage medium may be the storage unit or the memory module having the computer instructions stored thereon, as disclosed. In some embodiments, the computer-readable storage medium may be a disc or a flash drive having the computer instructions stored thereon.

A person skilled in the art can further understand that, various exemplary logic blocks, modules, circuits, and algorithm steps described with reference to the disclosure herein may be implemented as specialized electronic hardware, computer software, or a combination of electronic hardware and computer software. For examples, the modules/units may be implemented by one or more processors to cause the one or more processors to become one or more special purpose processors to executing software instructions stored in the computer-readable storage medium to perform the specialized functions of the modules/units.

The flowcharts and block diagrams in the accompanying drawings show system architectures, functions, and operations of possible implementations of the system and method according to multiple embodiments of the present invention. In this regard, each block in the flowchart or block diagram may represent one module, one program segment, or a part of code, where the module, the program segment, or the part of code includes one or more executable instructions used for implementing specified logic functions. It should also be noted that, in some alternative implementations, functions marked in the blocks may also occur in a sequence different from the sequence marked in the drawing. For example, two consecutive blocks actually can be executed in parallel substantially, and sometimes, they can also be executed in reverse order, which depends on the functions involved. Each block in the block diagram and/or flowchart, and a combination of blocks in the block diagram and/or flowchart, may be implemented by a dedicated hardware-based system for executing corresponding functions or operations, or may be implemented by a combination of dedicated hardware and computer instructions.

As will be understood by those skilled in the art, embodiments of the present disclosure may be embodied as a method, a system or a computer program product. Accordingly, embodiments of the present disclosure may take the form of an entirely hardware embodiment, an entirely software embodiment or an embodiment combining software and hardware for allowing specialized components to perform the functions described above. Furthermore, embodiments of the present disclosure may take the form of a computer program product embodied in one or more tangible and/or non-transitory computer-readable storage media containing computer-readable program codes. Common forms of non-transitory computer readable storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM or any other flash memory, NVRAM, a cache, a register, any other memory chip or cartridge, and networked versions of the same.

Embodiments of the present disclosure are described with reference to flow diagrams and/or block diagrams of methods, devices (systems), and computer program products according to embodiments of the present disclosure. It will be understood that each flow and/or block of the flow diagrams and/or block diagrams, and combinations of flows and/or blocks in the flow diagrams and/or block diagrams, can be implemented by computer program instructions. These computer program instructions may be provided to a processor of a computer, an embedded processor, or other programmable data processing devices to produce a special purpose machine, such that the instructions, which are executed via the processor of the computer or other programmable data processing devices, create a means for implementing the functions specified in one or more flows in the flow diagrams and/or one or more blocks in the block diagrams.

These computer program instructions may also be stored in a computer-readable memory that can direct a computer or other programmable data processing devices to function in a particular manner, such that the instructions stored in the computer-readable memory produce a manufactured product including an instruction means that implements the functions specified in one or more flows in the flow diagrams and/or one or more blocks in the block diagrams.

These computer program instructions may also be loaded onto a computer or other programmable data processing devices to cause a series of operational steps to be performed on the computer or other programmable devices to produce processing implemented by the computer, such that the instructions (which are executed on the computer or other programmable devices) provide steps for implementing the functions specified in one or more flows in the flow diagrams and/or one or more blocks in the block diagrams. In a typical configuration, a computer device includes one or more Central Processing Units (CPUs), an input/output interface, a network interface, and a memory. The memory may include forms of a volatile memory, a random access memory (RAM), and/or non-volatile memory and the like, such as a read-only memory (ROM) or a flash RAM in a computer-readable storage medium. The memory is an example of the computer-readable storage medium.

The computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The computer-readable medium includes non-volatile and volatile media, and removable and non-removable media, wherein information storage can be implemented with any method or technology. Information may be modules of computer-readable instructions, data structures and programs, or other data. Examples of a non-transitory computer-readable medium include but are not limited to a phase-change random access memory (PRAM), a static random access memory (SRAM), a dynamic random access memory (DRAM), other types of random access memories (RAMs), a read-only memory (ROM), an electrically erasable programmable read-only memory (EEPROM), a flash memory or other memory technologies, a compact disc read-only memory (CD-ROM), a digital versatile disc (DVD) or other optical storage, a cassette tape, tape or disk storage or other magnetic storage devices, a cache, a register, or any other non-transmission media that may be used to store information capable of being accessed by a computer device. The computer-readable storage medium is non-transitory, and does not include transitory media, such as modulated data signals and carrier waves.

The specification has described methods, apparatus, and systems for process triggering. The illustrated steps are set out to explain the exemplary embodiments shown, and it should be anticipated that ongoing technological development will change the manner in which particular functions are performed. Thus, these examples are presented herein for purposes of illustration, and not limitation. For example, steps or processes disclosed herein are not limited to being performed in the order described, but may be performed in any order, and some steps may be omitted, consistent with the disclosed embodiments. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope and spirit of the disclosed embodiments.

While examples and features of disclosed principles are described herein, modifications, adaptations, and other implementations are possible without departing from the spirit and scope of the disclosed embodiments. Also, the words "comprising," "having," "containing," and "including," and other similar forms are intended to be equivalent in meaning and be open ended in that an item or items following any one of these words is not meant to be an exhaustive listing of such item or items, or meant to be limited to only the listed item or items. It must also be noted that as used herein and in the appended claims, the singular forms "a," "an," and "the" include plural references unless the context clearly dictates otherwise.

It will be appreciated that the present invention is not limited to the exact construction that has been described above and illustrated in the accompanying drawings, and that various modifications and changes can be made without departing from the scope thereof. It is intended that the scope of the invention should only be limited by the appended claims.

What is claimed is:

1. A method, comprising:
   receiving an input operation on a lock screen of a terminal device;
   responsive to the input operation, and without unlocking the terminal device, determining input operation information corresponding to the input operation;
   determining triggering operation information matching with the determined input operation information;
   determining a process corresponding to the input operation according to a predetermined corresponding relationship between the triggering operation information and the process, wherein the input operation information is for accessing only the process, and wherein the input operation information does not have a function of unlocking the terminal device at a system level, wherein unlocking the terminal device at the system level includes making other processes on the terminal device accessible and unlocking the terminal device at the system level requires an unlock control different from the input operation information for accessing the process; and
   triggering the process without unlocking the terminal device at the system level.

2. The method of claim 1, wherein the triggering operation information comprises:
   default triggering operation information.

3. The method of claim 1, wherein the triggering operation information comprises:
   custom triggering operation information.

4. The method of claim 3, wherein the predetermined corresponding relationship is determined by:
   receiving custom triggering operation information inputted by a user;
   receiving a selection instruction inputted by the user;
   determining process identification information corresponding to the selection instruction; and
   establishing a corresponding relationship between the custom triggering operation information and the process identification information.

5. The method of claim 4, wherein the triggering the process comprises:
   acquiring the process identification information corresponding to the custom triggering operation information;
   searching for the process matching with the process identification information in a process list, according to the process identification information; and
   triggering the process matching with the process identification information.

6. The method of claim 1, wherein:
   the process is a payment Quick Response (QR) code in a payment application; and
   triggering the process comprises:
   triggering the payment QR code, and
   displaying the QR code.

7. A terminal device, comprising:
   a hardware processor; and
   a non-transitory machine-readable storage medium encoded with instructions executable by the hardware processor to perform a method comprising:
   receiving an input operation on a lock screen of a terminal device;

responsive to the input operation, and without unlocking the terminal device, determining input operation information corresponding to the input operation;

determining triggering operation information matching with the determined input operation information;

determining a process corresponding to the input operation according to a predetermined corresponding relationship between the triggering operation information and the process, wherein the input operation information is for accessing only the process, and wherein the input operation information does not have a function of unlocking the terminal device at a system level, wherein unlocking the terminal device at the system level includes making other processes on the terminal device accessible and unlocking the terminal device at the system level requires an unlock control different from the input operation information for accessing the process; and triggering the process without unlocking the terminal device at the system level.

8. The terminal device of claim 7, wherein the triggering operation information comprises:

default triggering operation information.

9. The terminal device of claim 7, wherein the triggering operation information comprises:

custom triggering operation information.

10. The terminal device of claim 9, wherein the predetermined corresponding relationship is determined by:

receiving custom triggering operation information inputted by a user;

receiving a selection instruction inputted by the user;

determining process identification information corresponding to the selection instruction; and establishing a corresponding relationship between the custom triggering operation information and the process identification information.

11. The terminal device of claim 10, wherein the triggering the process comprises:

acquiring the process identification information corresponding to the custom triggering operation information;

searching for the process matching with the process identification information in a process list, according to the process identification information; and triggering the process matching with the process identification information.

12. The terminal device of claim 7, wherein:

the process is a payment Quick Response (QR) code in a payment application; and triggering the process comprises:

triggering the payment QR code, and displaying the QR code.

13. The terminal device of claim 7, wherein the input operation information comprises at least one of:

a swipe password;

a text password; or a fingerprint.

14. A non-transitory machine-readable storage medium encoded with instructions executable by the hardware processor to perform a method comprising:

receiving an input operation on a lock screen of a terminal device;

responsive to the input operation, and without unlocking the terminal device, determining input operation information corresponding to the input operation;

determining triggering operation information matching with the determined input operation information;

determining a process corresponding to the input operation according to a predetermined corresponding relationship between the triggering operation information and the process, wherein the input operation information is for accessing only the process, and wherein the input operation information does not have a function of unlocking the terminal device at a system level, wherein unlocking the terminal device at the system level includes making other processes on the terminal device accessible and unlocking the terminal device at the system level requires an unlock control different from the input operation information for accessing the process; and triggering the process without unlocking the terminal device at the system level.

15. The non-transitory machine-readable storage medium of claim 14, wherein the triggering operation information comprises:

default triggering operation information.

16. The non-transitory machine-readable storage medium of claim 14, wherein the triggering operation information comprises:

custom triggering operation information.

17. The non-transitory machine-readable storage medium of claim 16, wherein the predetermined corresponding relationship is determined by:

receiving custom triggering operation information inputted by a user;

receiving a selection instruction inputted by the user;

determining process identification information corresponding to the selection instruction; and establishing a corresponding relationship between the custom triggering operation information and the process identification information.

18. The non-transitory machine-readable storage medium of claim 17, wherein the triggering the process comprises:

acquiring the process identification information corresponding to the custom triggering operation information;

searching for the process matching with the process identification information in a process list, according to the process identification information; and triggering the process matching with the process identification information.

19. The non-transitory machine-readable storage medium of claim 14, wherein:

the process is a payment Quick Response (QR) code in a payment application; and triggering the process comprises:

triggering the payment QR code, and displaying the QR code.

20. The non-transitory machine-readable storage medium of claim 14, wherein the input operation information comprises at least one of:

a swipe password;

a text password; or a fingerprint.

* * * * *